United States Patent [19]
Oberg

[11] 4,446,017
[45] May 1, 1984

[54] OIL FILTER ASSEMBLY HAVING A REMOVABLE FILTER MEMBER

[76] Inventor: Gordon D. Oberg, 1717 S. Lake Stickney Dr., Lynnwood, Wash. 98036

[21] Appl. No.: 387,151

[22] Filed: Jun. 10, 1982

[51] Int. Cl.$^3$ .............................................. B01D 27/10
[52] U.S. Cl. ..................................... 210/90; 210/247; 210/420; 210/455; 210/456
[58] Field of Search ................. 210/90, 130, 132, 133, 210/247, 420, 422, 455, 456

[56] References Cited

U.S. PATENT DOCUMENTS

| | | |
|---|---|---|
| 463,410 | 11/1891 | Weaver . |
| 876,901 | 1/1908 | Ernst et al. . |
| 1,488,671 | 4/1924 | Hale . |
| 2,280,480 | 4/1942 | Cox . |
| 2,808,937 | 10/1957 | O'Meara . |
| 2,862,623 | 12/1958 | Werner . |
| 3,361,261 | 1/1968 | Fairey et al. . |
| 3,560,377 | 2/1971 | Loeffler ........................ 210/456 X |
| 3,567,028 | 3/1971 | Nose ................................. 210/232 |
| 3,715,870 | 2/1973 | Guzick . |
| 4,028,248 | 6/1977 | Muravskas et al. . |
| 4,115,201 | 9/1978 | Malec ............................. 210/456 X |
| 4,246,109 | 1/1981 | Manders ........................ 210/130 X |

Primary Examiner—David R. Sadowski
Attorney, Agent, or Firm—Laubscher, Philpitt & Laubscher

[57] ABSTRACT

An oil filter assembly is disclosed, characterized by a sectional housing and a removable filter member arranged therein. The housing includes base and cover members having adjacent planar faces which contain a plurality of corresponding, circular, concentrically spaced grooves which define a plurality of ribs. A radial groove in the face of each member extends through each of the associated ribs to afford communication between the associated grooves. The radial grooves of the housing members extend diametrically radially outwardly in opposite directions and the housing contains inlet and outlet openings communicating with the radial grooves, respectively. The filter member has a planar configuration, is removably mounted between the base and cover members, and extends between the circular grooves contained in the base and cover members on opposite sides of the filter. Oil to be filtered is supplied to the inlet opening and distributed across the face of the associated member via the radial and circular grooves thereof. The oil passes through the filter member and is discharged from the housing through the outlet opening via the circular and radial grooves contained in the other housing member.

7 Claims, 6 Drawing Figures

Fig. 2
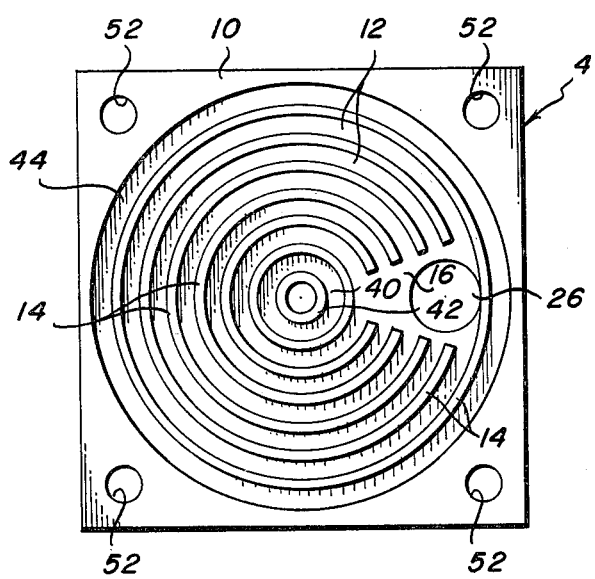
Fig. 4
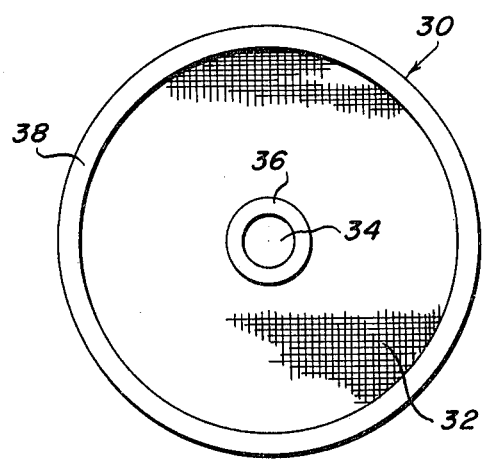
Fig. 3
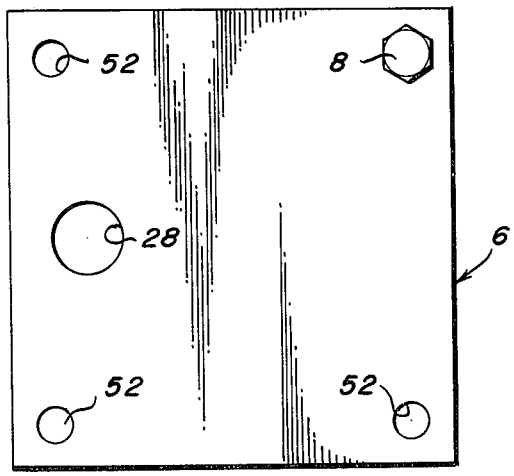
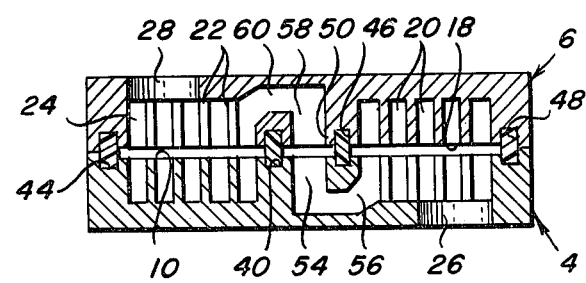
Fig. 5

OIL FILTER ASSEMBLY HAVING A REMOVABLE FILTER MEMBER

BACKGROUND OF THE INVENTION

The present invention relates to an improved oil filter assembly for filtering virtually all of the oil delivered to an automobile engine. The assembly is permanently mounted adjacent the engine and contains a re-usable planar filter member which is easily removed from the assembly for inspection and cleaning.

Fluid filters having generally planar filter elements are well-known in the patented prior art as evidenced by the patents to Cox U.S. Pat. No. 2,280,480, Ernst et al U.S. Pat. No. 876,901, Werner U.S. Pat. No. 2,862,623 and Hale U.S. Pat. No. 1,488,671. The Cox patent, for example discloses an oil filter comprising a housing having inlet and outlet openings and containing a replaceable filter element which includes a filter sheet, a layer of charcoal, a perforated plate, and a filtering cloth. Similarly, the Ernst et al patent discloses a filter formed of a layer of filtering material arranged between two layers of wire gauge. The patent to Werner discloses a fuel filter for internal combustion engines which comprises two shell members which define a housing within which there is arranged a porous filter plate. Finally, the Hale patent discloses a strainer containing a generally planar screen for filtering particulates from a fluid such as water, air, or oil. While the prior devices normally operate quite satisfactorily, they each possess certain inherent drawbacks which limit their filtering efficiency. Thus, for example, none of the prior devices include apparatus for distributing the medium to be filtered about the entire surface area of the filter. Accordingly, the prior filters quickly become clogged and restrict the flow of the fluid medium. Furthermore, none of the filter members of the prior devices are readily removable for cleaning and re-use.

The present invention was developed in order to overcome these and other drawbacks of the prior devices by providing a permanent oil filter assembly which efficiently and reliably filters oil to an engine. The assembly is designed to distribute oil to be filtered over the entire surface area of a planar filter member, whereby the oil will be filtered uniformly. Furthermore, the filter member may be readily removed from the assembly for inspection, cleaning and re-use.

SUMMARY OF THE INVENTION

Accordingly, it is a primary object of the present invention to provide an oil filter assembly including a sectional housing including base and cover members having adjacent planar faces containing a plurality of corresponding, circular, concentrically spaced grooves which define a plurality of concentrically spaced circular ribs, respectively. The planar faces of each of the base and cover members also contain a radial groove extending through each of the associated ribs, respectively, thereby to define a passage affording communication between the associated grooves. The radial grooves of the base and cover members extend diametrically radially outwardly in opposite directions from the associated inner groove, respectively. The housing contains inlet and outlet openings communicating with the radial grooves, respectively. A planar filter member is removably mounted between the planar faces of the cover and base members and extends between the circular grooves contained therein, respectively. The base and cover members are connected together on opposite sides of the filter member by fastening devices. When a fluid to be filtered is supplied to the inlet opening, the fluid is distributed across the face of the associated member via the radial and circular grooves thereof, passes through the filter member, and is discharged from the housing through the outlet opening and via the circular and radial grooves contained in the other housing member.

According to a further object of the invention, the filter member comprises a wire mesh containing a central opening and including sealing devices extending around the central opening and circumference thereof. The sealing devices of the filter member are adapted to be received by corresponding grooves provided in the base and cover members of the housing, whereby leakage of the fluid is avoided.

According to a more specific object of the invention, a valve operated pressure relief fluid bypass is provided in the base and cover members to transport fluid through the opening in the filter member when the fluid pressure within the housing exceeds a given value owing to clogging of the mesh.

BRIEF DESCRIPTION OF THE DRAWING

Other objects and advantages of the subject invention will become apparent from a study of the following specification when viewed in the light of the accompanying drawing, in which:

FIG. 2 is a front plan view of the planar face of the housing base member;

FIG. 3 is a front plan view of the housing cover member;

FIG. 4 is a plan view of the filter member;

FIG. 5 is a sectional view of the oil filter assembly taken along line 5—5 of FIG. 1.

DETAILED DESCRIPTION

Figure 1:
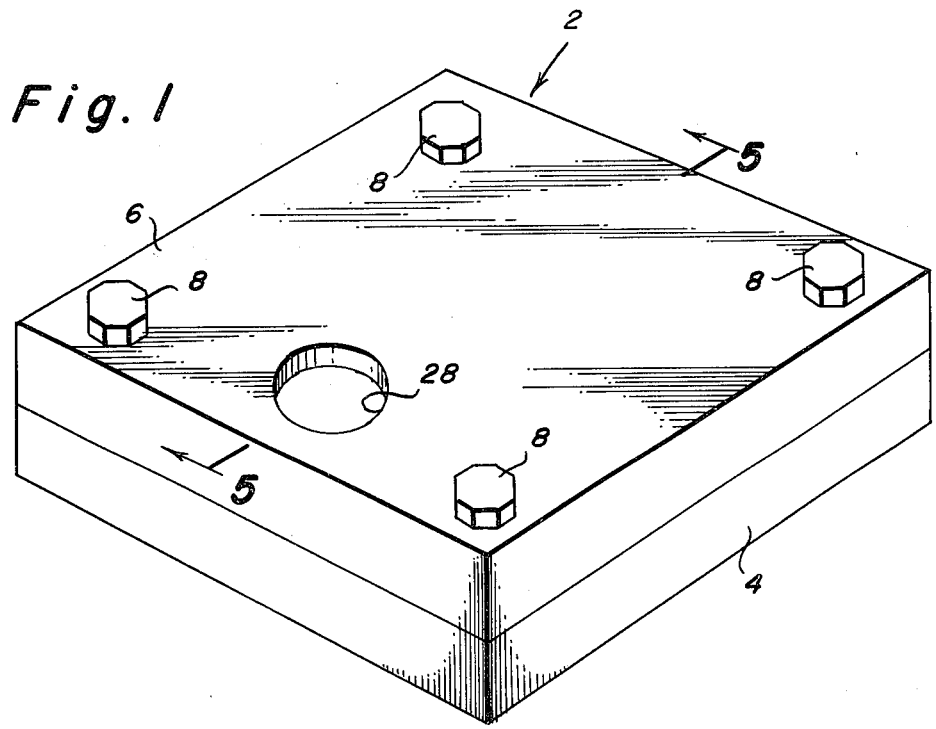
FIG. 1 is a perspective view of the oil filter assembly.

The oil filter assembly of the subject invention is shown in FIG. 1. The assembly comprises a sectional housing 2 including a base member 4 and a cover member 6 which are connected together by any suitable means such as bolts 8 which pass through aligned threaded openings in the sectional members.

Referring now to FIG. 2, the base member 4 is shown having a planar face 10 which contains a plurality of circular, concentrically spaced grooves 12 which define a plurality of concentrically spaced circular ribs 14. A radial groove 16 contained in the planar face 10 of the base member extends through each of the ribs to define a passage for communication between the grooves.

As shown in the sectional view of FIG. 5, the cover member 6 also has a planar face 18 containing a plurality of circular, concentrically spaced grooves 20 which define a plurality of concentrically spaced circular ribs 22. A radial groove 24 is also provided in the face of the cover member and extends through each of the ribs to define a passage for communication between the grooves thereof.

The planar faces of the base and cover members are arranged adjacent one another when the members are connected to form the housing of the oil filter assembly as shown in FIG. 5. Furthermore, the ribs 22 and circular grooves 20 of the cover member 6 are arranged opposite and correspond to the ribs 14 and circular grooves 12 of the base member 4. The radial groove 24 of the cover member, however, extends diametrically radially outwardly from the innermost groove in a direction opposite to that of the radial groove 16 of the base member as shown in FIG. 5 and as will be discussed in greater detail below.

As shown in FIGS. 2 and 5, the base member 4 contains in outlet opening 26 which communicates with the base member radial groove 16. Similarly, as shown in FIGS. 1, 3, and 5, the cover member 6 contains an inlet opening 28 which communicates with the cover member radial groove 24. When the housing is assembled as shown in FIG. 5, the inlet 28 and outlet 26 openings are arranged diametrically opposite one another as are the base and cover member radial grooves 16, 24.

A filter member 30 for use in the oil filter assembly is shown in FIG. 4. The filter member comprises a mesh 32 such as a wire screen having openings on the order of 200 microns. In its preferred form, the filter member has a planar, circular configuration and contains a central opening 34. A first sealing device 36 is arranged around the inner diameter of the filter member adjacent the central opening and a second sealing device 38 is arranged around the circumference of the filter member. In a preferred embodiment, the sealing devices comprise O-rings formed of a synthetic plastic or rubber material.

The filter member 30 is removably mounted between the planar faces of the cover and base member with the mesh 32 extending between the circular grooves of the base and cover members, respectively. In this regard, the base member contains in its planar face 10 an inner seating channel 40 arranged within and spaced from the associated inner most circular groove to define a central portion 42. The base member planar face further includes an outer seating channel 44 arranged outside of and spaced from the associated outer most circular groove. The cover member planar face 18 contains inner 46 and outer 48 seating channels corresponding to the base member seating channels 40 and 42, respectively, with the inner seating channel 46 defining a central portion 50. As shown in FIG. 5, the corresponding inner and outer seating channels of the base and cover members are adapted to receive the first and second O-rings, respectively, of the filter member. In FIG. 5, the mesh 32 of the filter member has been omitted for clarity.

In order to assemble the device, the filter member is arranged between the base and cover members with the O-rings arranged in the seating channels. The cover member is then connected with the base member by tightening the bolts 8 which pass through the aligned threaded openings 52 in the base and cover members.

The oil filter assembly is adapted for use in connection with any type of engine. The assembly is permanently mounted adjacent the device by a suitable mounting assembly (not shown). Oil to be filtered is delivered from the oil pump of the engine through a line to the input opening 28 which is preferably threaded for connection with the line from the oil pump. The oil passes through the radial groove 24 of the cover member into the circular grooves 20 of the cover member for distribution across the planar face thereof. The oil then passes through the mesh 32 of the filter member whereby minute particulates and contaminants are removed from the oil. The filtered oil flows into the circular grooves 12 of the base member for passage to the outlet opening 26 via the radial passage 16 thereof. The filtered oil is discharged from the oil filter assembly via the outlet opening and transported through a line (not shown) to the engine. The outlet opening may be threaded for connection with the line to the engine.

The oil filter assembly is capable of filtering up to 20 gallons of oil per minute at oil pressure up to 200 psi. Because of the unique arrangement of grooves within the planar faces of the base and cover members and owing to the diametrically opposed arrangement of the inlet and outlet openings, the oil is distributed over the entire surface area of the filter member for more efficient cleaning and increased fluid flow. Accordingly, the filter is particularly suitable for high performance engines and other applications where cleanliness of the lubricating oil is important.

After use for a significant period of time, particulates from the filtered oil will accumulate on the filter mesh, thereby restricting the flow of oil through the mesh. It will be appreciated that the filter may be removed from the assembly for cleaning and inspection merely by removing the fastening bolts and separating the cover member from the base member to expose the filter member. At this point, the filter may be visually inspected to determine the degree of wear on the engine. Following removal of the filter, the mesh is cleaned with a suitable solvent such as gasoline and the filter is replaced in the seating channels. The cover member is then re-connected with the base member. Owing to the relatively low internal volume of the housing, only about one-half cup of oil is lost during removal of the filter. Accordingly, the oil need not be drained from the engine in order to clean the filter member.

Should particulates continue to accumulate on the filter mesh prior to cleaning thereof, the oil pressure will rise beyond a safe value. Accordingly, the oil filter assembly includes a pressure relief oil bypass conduit which transports oil between the inlet and outlet openings via the opening in the filter member when the oil pressure reaches a given value.

As shown in FIG. 5, the central portion 42 of the base member planar face contains an aperture 54 arranged along the axis of the associated circular grooves 12. The base member 4 further includes a radial conduit 56 arranged between the lower portion of the aperture 54 and the radial groove 16 affording fluid communication therebetween. Similarly, the central portion 50 of the cover member planar face contains an aperture 58 arranged along the axis of its associated circular grooves, and a conduit 60 is provided in the cover member 6 between the lower portion of the aperture and the radial groove 24 to afford fluid communication therebetween. The apertures and conduits combine to form the pressure relief oil bypass conduit.

Preferably, the pressure relief oil bypass conduit includes a normally closed valve (not shown in FIG. 5 for clarity) which is activated to open the conduit when the pressure within the housing reaches a given value. A preferred type of valve is illustrated in FIG. 6.

Figure 6:
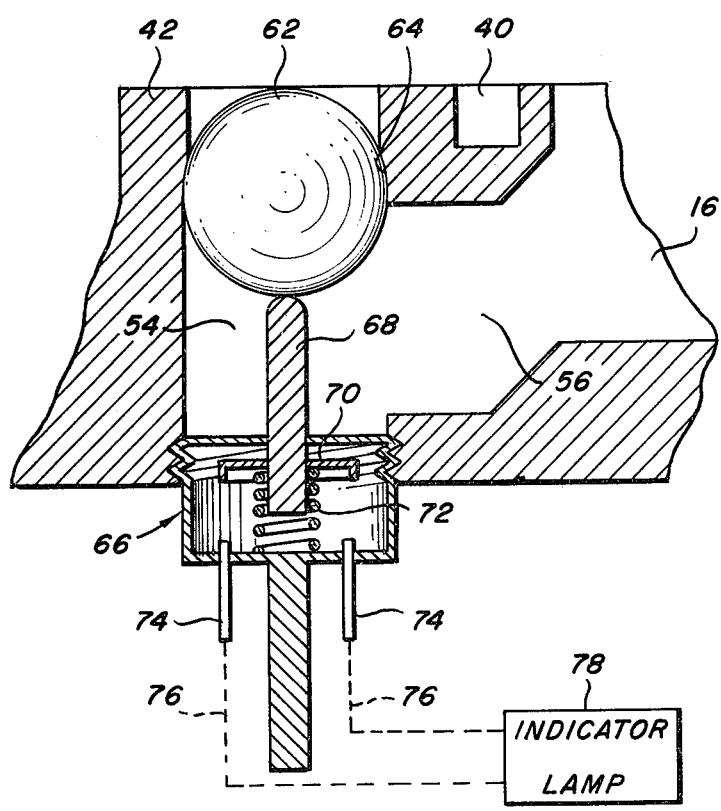
FIG. 6 is a detailed sectional view of a fluid bypass conduit, valve, and switch arranged in the central portion of the base member.

FIG. 6 is a detailed sectional view of the central portion 42 of the base member 4. The aperture 54 of the base member central portion contains a ball bearing 62 which in its closed position impedes fluid flow through the aperture 54 into the conduit 56. The ball bearing is normally biased to its closed position by any suitable means such as a spring connected with a bolt (not shown) which is threadably connected with the base member. The walls which define the aperture 54 are bevelled at 64 to prevent removal of the ball bearing from the aperture.

As particulates accumulate on the filter mesh and the flow of oil therethrough is impeded, an increasing volume of oil flows into the cover member radial conduit 60 and aperture 58 and pushes against the ball bearing 62 in the base member aperture 54. As the oil pressure increases, owing to restricted flow through the filter mesh, the oil pressure reaches a given value which is greater than the biasing force of the spring against the ball bearing, whereby the ball bearing is displaced by the oil pressure against the spring to open the conduit 56 in the base member, thereby to afford fluid communication to the outlet radial groove 16 and the outlet opening 26.

Preferably, the spring which biases the ball bearing is combined with a switch mechanism 66 as shown in FIG. 6. The switch mechanism is threadably connected with the base member 4 and includes a plunger 68 to which is connected a contact plate 70 which is biased toward an extended position by a spring 72. The switch mechanism further includes a pair of terminals 74 which are connected by electrical leads 76 to an indicator lamp 78. Thus when the ball bearing 62 is displaced by the increased oil pressure against the bias force of the spring, the contact plate 72 engages the terminals 74 to actuate the indicator lamp to provide a warning that the filter mesh has become clogged and should be removed for cleaning.

While the oil filter assembly has been described for use with an engine such as an automobile internal combustion engine, it will be apparent to those skilled in the art that the assembly is suitable for use in dry sump systems, or in oil cooling systems for a trans or rear end of a vehicle, or in any environment where a fluid is to be filtered.

While in accordance with the provisions of the Patent Statutes the preferred forms and embodiments have been illustrated and described, it will be apparent to those skilled in the art that various changes and modifications may be made without deviating from the inventive concepts set forth above.

What is claimed is:

1. An oil filter assembly, comprising
   (a) a sectional housing including base and cover members having adjacent facing planar faces defining a plurality of corresponding circular spaced concentric grooves and further defining a plurality of spaced circular concentric ribs, respectively, said base member planar face also defining a radial groove extending from an inner portion thereof through each of said base member ribs to an outer portion thereof to define a passage affording communication between said base member concentric grooves, said cover member planar face also defining a radial groove extending from an inner portion thereof through each of said cover member ribs to an outer portion thereof to define a passage affording communication between said cover member concentric grooves, said radial grooves of said base and cover members extending diametrically radially outwardly in opposite directions, respectively, said housing defining inlet and outlet openings communicating with said radial grooves adjacent said base and cover member planar face outer portions, respectively;
   (b) a planar filter member having a circular configuration and removably mounted between said cover and base member planar faces and extending between said circular grooves defined thereby, respectively;
   (c) outer sealing means arranged adjacent the circumference of said filter member for providing a seal between said filter member and said base and cover planar faces, respectively; and
   (d) means connecting said base and cover members together on opposite sides of said filter member and for providing that when fluid to be filtered is supplied to said inlet opening, the fluid is distributed across said face of said member defining said inlet opening via said radial and circular grooves thereof, passes through said filter member, and is discharged from said housing via said circular and radial grooves contained in said member defining said outlet opening, and via said outlet opening.

2. Apparatus as defined in claim 1, wherein said filter member comprises a mesh containing a central opening.

3. Apparatus as defined in claim 2, wherein said filter member includes inner sealing means arranged adjacent said central opening, and further wherein said base and cover member planar faces each define inner and outer circular seating channels for receiving said inner and outer sealing means, respectively.

4. Apparatus as defined in claim 3, and further comprising pressure relief fluid bypass means for passing fluid through said filter central opening in response to fluid pressure above a given value.

5. Apparatus as defined in claim 4, wherein said base and cover member planar faces each include a central portion defined by said inner seating channels, respectively, said central face portion of each of said base and cover members containing an aperture long the central axis of said associated circular grooves, respectively, said base member further including a radial conduit arranged between said base member radial groove and said base member aperture, said cover member further including a radial conduit arranged between said cover member radial groove and said cover member aperture, and further wherein one of said base and cover member apertures contains valve means for opening and closing said conduit contained in said one member.

6. Apparatus as defined in claim 5, wherein said valve means comprises a ball bearing and means for biasing said ball bearing toward a normally closed position.

7. Apparatus as defined in claim 6, wherein said biasing means comprises switch means operable in response to opening of said valve means, and further comprising indicator means actuated in response to said switch means.

* * * * *